United States Patent [19]

Shoberg

[11] 4,131,343

[45] Dec. 26, 1978

[54] HIGH SPEED MOVIE CAMERA

[75] Inventor: Robert D. Shoberg, Ventura, Calif.

[73] Assignee: Photonic Systems, Inc., Sunnyvale, Calif.

[21] Appl. No.: 806,623

[22] Filed: Jun. 15, 1977

[51] Int. Cl.² .......................................... G03B 41/00
[52] U.S. Cl. ...................................... 352/84; 352/119
[58] Field of Search .................................. 352/84, 119

[56] References Cited

U.S. PATENT DOCUMENTS

| 2,464,384 | 3/1949 | Ehrenhaft | 352/119 |
| 3,259,448 | 7/1966 | Whitley et al. | 352/84 |
| 3,447,866 | 6/1969 | Heisler | 352/119 |
| 3,523,722 | 8/1970 | Beaman | 352/84 |

Primary Examiner—Monroe H. Hayes
Attorney, Agent, or Firm—Ralph B. Pastoriza

[57] ABSTRACT

The camera has first and second sprocket rollers for passing film into and receiving film from a film gate which are positively geared together to assure uniform tension and thus avoid frame line movement. In addition, an optical prism arrangement is provided providing a folded optical path to enable accommodation of a longer back focus objective lens length than could otherwise be accommodated within a given camera casing size. A rotating multi-surfaced prism is mounted on the same shaft as one of the sprocket rollers to cause image movement through the film gate with movement of the film so that continuous film movement can be realized. A rotatable shutter intercepts the light to the film gate and is positively interconnected with rotation of the multi-surfaced prism and sprocket rollers such that a series of images can be successively photographed during continuous film movement. Phase relationships between the first and second sprockets can be adjusted to provide a desired tension on the film passing through the film gate, the multi-surfaced prism shutter and sprocket rollers all thereafter rotating in precise synchronous relationship.

5 Claims, 6 Drawing Figures

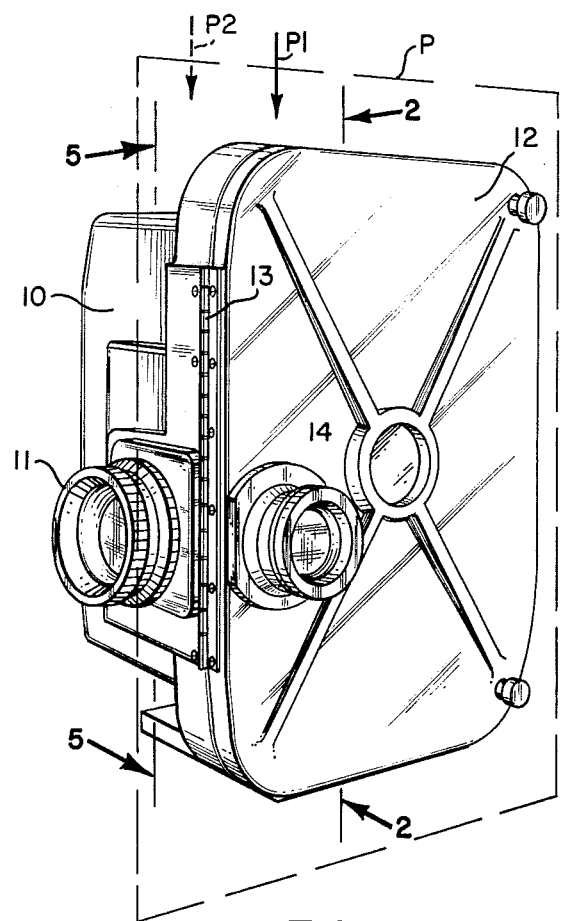
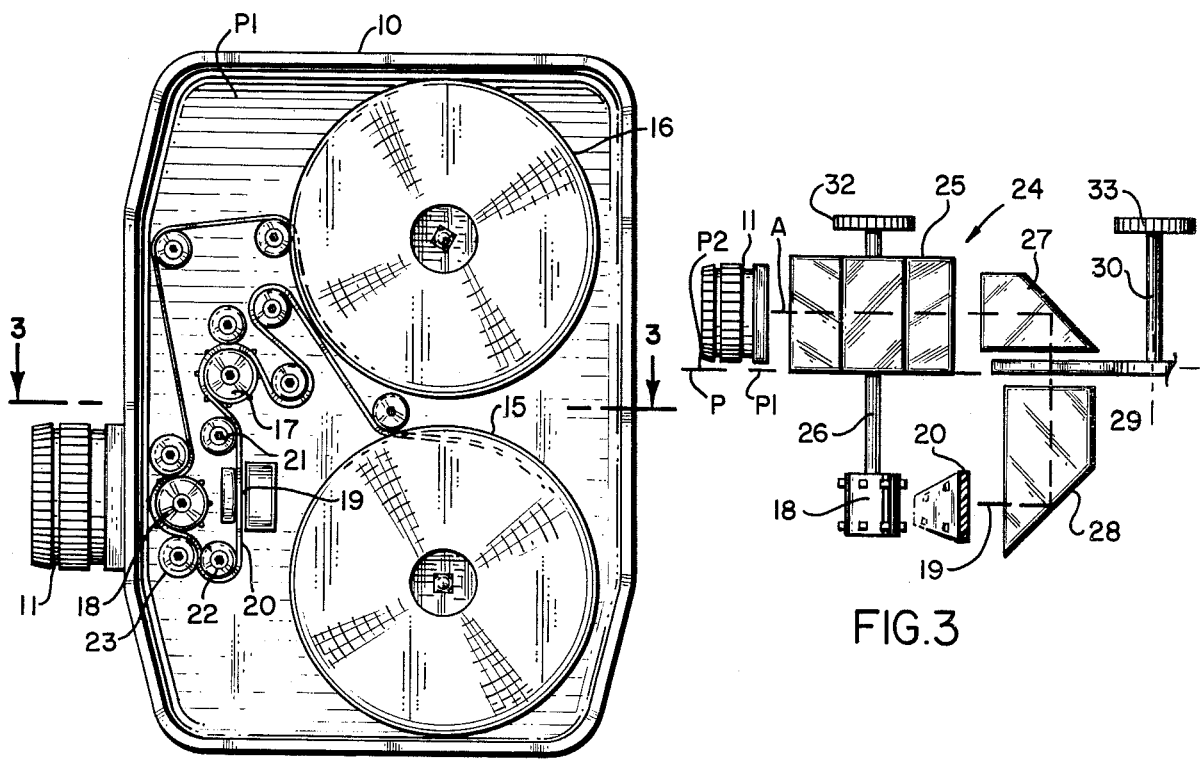
FIG. 1
FIG. 3
FIG. 2

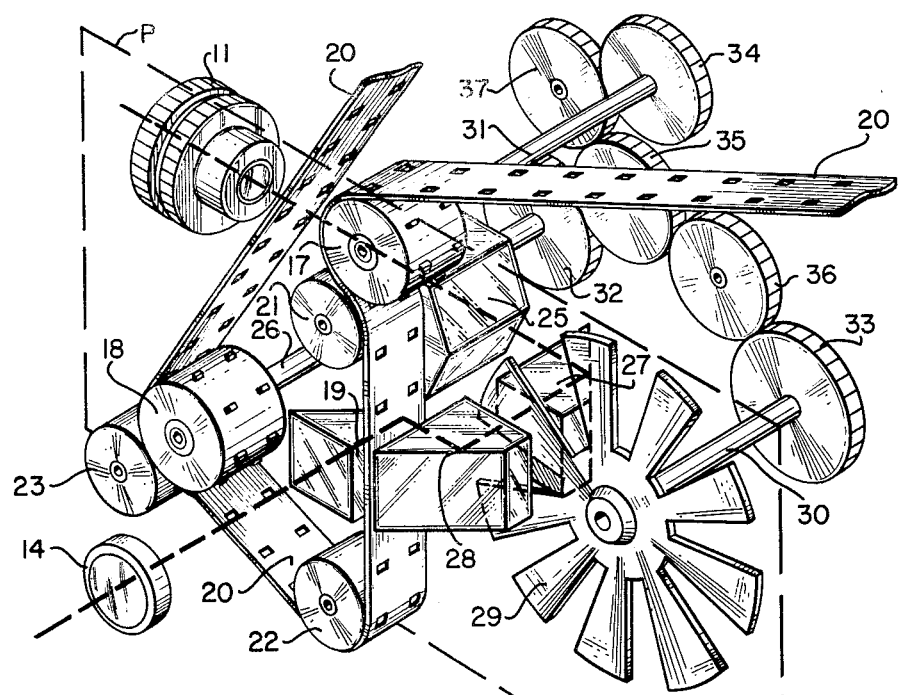
FIG.4
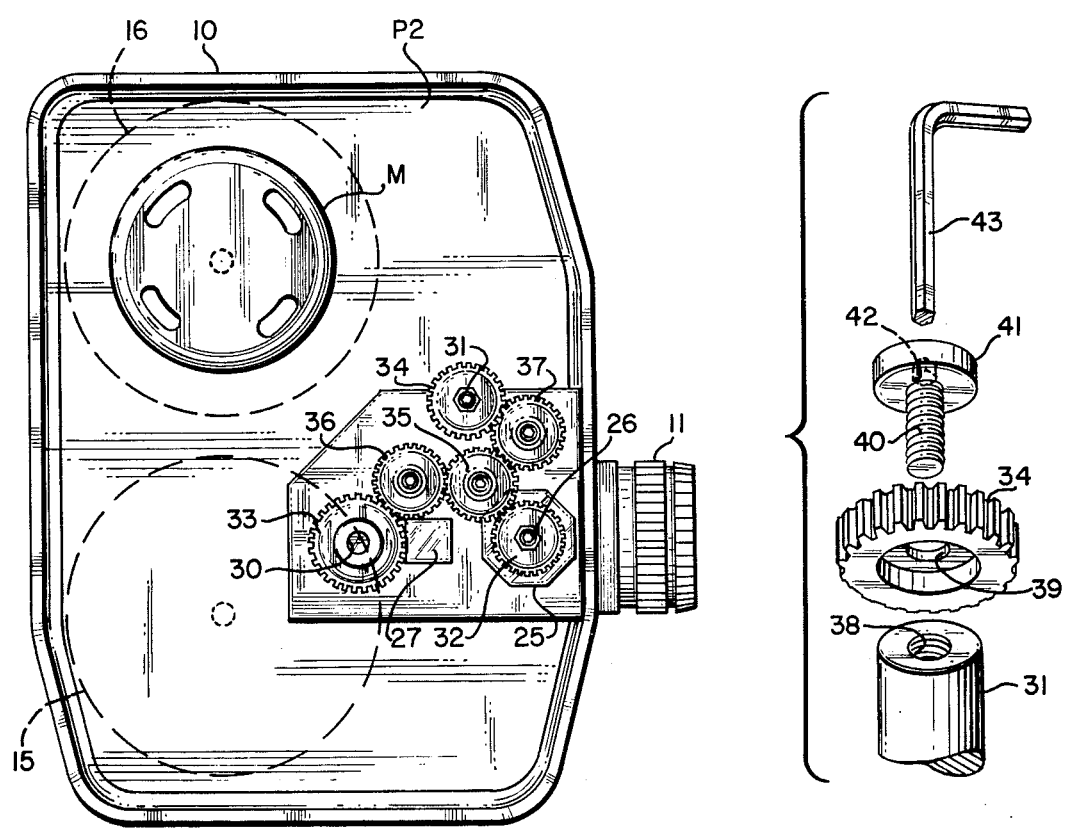
FIG.5
FIG.6

HIGH SPEED MOVIE CAMERA

This invention relates generally to movie cameras and more particularly to improvements in high speed movie cameras.

BACKGROUND OF THE INVENTION

High speed motion picture cameras are well known in the art and most operate on the principle of providing a continuous film movement so that high film speed can be achieved as opposed to the usual intermittent film movement. To provide the desired succession of images on the film, a multi-surfaced rotating prism is employed to move the imaged scene in the film gate at the same speed as movement of the film, a shutter interrupting this operation after completion of rotation of the multi-surfaced prism through a given circumferential distance and the start of an image formation by the next surface of the prism.

A typical example of the foregoing type of high speed movie camera is shown and described in U.S. Pat. No. 3,259,448 issued July 5, 1966 which represents the closest prior art of which Applicant is aware.

The foregoing patent describes a high speed movie camera incorporating various improvements over previous high speed movie cameras principally resulting in a more compact configuration than theretofore available and better registration and synchronization by positively interconnecting the shutter with the rotating multi-faced prism and a sprocket roller controlling movement of the film through the film gate imaging plane. Part of the increased compactness has also been realized by folding the optical path of light from the objective lens to the imaging plane at the film gate.

Cameras of the foregoing type are capable of photographing scenes at the rate of 10,000 frames per second. At such high speeds, one of the major problems introduced is a tendency for movement or jiggling of the position of the transversely extending vertical frame lines on the film. This disadvantage is a result of non-uniform tension in the portion of the film passing through the film gate where the scene is imaged onto the moving film. Another problem with such cameras is that in providing the folded optical path a relatively large number of light directing optical surfaces are required either in the form of mirrors or right angled prisms.

Further improvements in high speed motion picture cameras are thus needed to correct the foregoing deficiencies.

BRIEF DESCRIPTION OF THE PRESENT INVENTION

With the foregoing in mind, the present invention contemplates such an improved high speed movie camera wherein the foregoing disadvantages are avoided.

More particularly, in accord with this invention, there are provided first and second sprocket rollers for passing film into and receiving said film from the film gate respectively. These sprocket rollers are positively interconnected so that a uniform tension is maintained on the portion of film passing through the film gate thereby avoiding heretofore referred to vertical frame line movement. An optical means is provided for imaging a scene to be photographed on the film gate which includes a multi-surfaced prism connected to the second sprocket roller for rotation therewith to cause an imaged scene to move along the film gate, with movement of the film through the film gate. Appropriate shutter means intercept light passed to the film gate after each rotation of the multi-surfaced prism a given circumferential distance to enable a series of separate images to be successively recorded on the film while the film continuously moves. Positive interconnecting means are provided between the multi-surfaced prism, the shutter means, and the first sprocket roller for assuring simultaneous rotation thereof in a predetermined synchronous relationship.

In addition to the multi-surfaced rotatable prism, there are only necessary two additional prisms for folding the optical path between the multi-surfaced prism and the film gate. These two additional prisms constitute right angle prisms and fold the optical path in such a manner as to enable accommodation of a longer back focus objective lens within a given sized casing than would otherwise be accommodated.

In the preferred embodiment of this invention, the interconnecting means for the various rotating components described constitute intermeshing gears, there being provided adjustment means for certain ones of these gears to change their phase relationship with each other.

BRIEF DESCRIPTION OF THE DRAWINGS

A better understanding of this invention will be had by now referring to the accompanying drawings in which:

FIG. 1 is a three quarter front perspective view of the high speed motion picture camera of this invention;

FIG. 2 is a cross section taken in the direction of the arrows 2—2 of FIG. 1 showing one interior side portion of the camera;

FIG. 3 is a schematic diagram of various optical components in their relative positions looking generally in the direction of the arrows 3—3 of FIG. 2;

FIG. 4 is a schematic type perspective view of the basic components constituting the heart of the high speed movie camera of this invention;

FIG. 5 is a cross section showing the opposite side of the interior of the camera to that illustrated in FIG. 2 looking generally in the direction of the arrows 5—5 of FIG. 1; and FIG. 6 is an exploded fragmentary perspective view of a mechanical means for adjusting the phase relationship between various gear components illustrated in FIG. 5.

DETAILED DESCRIPTION OF THE PREFERRED EMBODIMENT

Referring first to FIG. 1, the high speed movie camera includes a casing 10 mounting a front objective lens 11 and provided with a cover 12. The cover 12 is hinged at 13 to permit opening of the casing to expose the interior for inserting and removing film. A through-the-lens focusing eye piece 14 may be provided on the cover such that when the cover is closed, the imaged scene within the interior of the casing in the film gate can be viewed.

For convenience in describing the relative positions of components in the interior of the casing 10, there is illustrated a vertical medial plane P by the dashed lines passing through the interior of the casing dividing various components mounted on one side of this plane from various components mounted on the other side. The one side of the plane is designated P1 and the other side P2.

Thus, referring to FIG. 2 there is shown a side elevation of the camera of FIG. 1 with the cover removed to expose the one side P1 of the medial plane. The components of this one side include pay-out and take-up film reels 15 and 16 mounted in the casing, the mounting for the front objective lens 11 being on the other side P2 of the medial plane as indicated in FIG. 1.

As shown in FIG. 2, there are provided first and second sprocket rollers 17 and 18 for passing film into and receiving film from a film gate 19, respectively. The portion of the film in the film gate 19 itself is indicated at 20 and the threading of this film from the pay-out reel 15 to the take-up reel 16 over the first and second sprocket rollers 17 and 18 will be evident from FIG. 2. In this respect, there are provided appropriate guide rollers 21 and 22 adjacent to the entrance and exist ends of the film gate 19, the guide roller 21 assuring proper engagement of the film by the sprocket teeth of the first sprocket roller 17. A third guide roller 23 is shown receiving film from the guide roller 22 and assuring proper sprocket engagement by the second sprocket roller 18. Additional appropriate guide rollers are also illustrated for guiding the film between the pay-out and take-up reels.

Referring now to the top cross section of FIG. 3 there is shown an optical means designated generally by the numeral 24 associated with the objective lens 11. This optical means includes a multi-surfaced prism 25 which is mounted on the other side P2 of the medial plane P which runs normal to the plane of the drawing of FIG. 3. In this respect, there is provided a prism shaft 26 actually mounting the multi-surfaced prism 25 in a position intercepting the optical axis A of the objective lens 11. This prism shaft 26 passes through the medial plane to the said one side P1 of the medial plane and serves to mount the second referred to sprocket roller 18 described in FIG. 2 so that the multi-surfaced prism 25 and second sprocket roller 18 are mounted on the common shaft 26 for rotation together.

The optical means 24 further includes a first right angle prism 27 on the referred to other side of the medial plane P in a position behind the multi-surfaced prism 25 to optically direct light passing rearwardly through the multi-surfaced prism in a lateral direction to pass normally through the medial plane P.

A second right angle prism 28 in turn is mounted on the one side P1 of the medial plane P in a position to optically direct light received from the first right angle prism 27 in a forward direction to the film imaging gate 19 which is positioned ahead of the second right angle prism on the said one side P1 of the medial plane. The film 20 is shown in cross section in FIG. 3 in this film gate imaging plane 19.

Still referring to FIG. 3 there is shown a rotatable shutter 29 mounted on a shutter shaft 30. The shutter 29 essentially lies in the medial plane P, the shutter shaft 30 extending normally from the medial plane into the other side P2 thereof. The shutter itself passes between the first and second right angle prisms 27 and 28 as indicated.

The optical system of FIG. 3 as well as the sprocket rollers, guide rollers and shutter arrangement can better be visualized by now referring to FIG. 4 wherein corresponding parts are designated by the same numerals. In FIG. 4, it will be noted that the first sprocket roller 17 described in FIG. 2 is mounted on a shaft 31 passing normally through the medial plane P. Intermeshing gear means are provided on this other side of the medial plane interconnecting the common shaft 26 for the prism 25 and second sprocket roller 18, the shutter shaft 30 and the referred to first sprocket shaft 31 for a simultaneous rotation so that proper synchronism of rotation of the prism with rotation of the shutter and the first and second sprocket rollers is assured.

The foregoing intermeshing gear means includes a prism shaft gear 32, shutter shaft gear 33 and sprocket shaft gear 34 mounted on the ends of the prism, shutter and sprocket shafts respectively. First, second and third idler gears 35, 36 and 37 respectively engage the prism shaft gear 32, the shutter shaft gear 33 and the sprocket shaft gear 34. In addition, the first idler gear 35 is in meshing engagement with both the second and third idler gears 36 and 37.

The various intermeshing gears described in FIG. 4 are clearly visible in the side view of FIG. 5 showing the referred to other side P2 of the medial plane. Thus, the prism shaft 26 mounting prism 25 and the second sprocket roller 18 on the one side of the medial plane described in FIG. 4 and illustrated in FIG. 2 has its gear 32 meshing with the first idler gear 35. Idler gear 35 in turn meshes with second idler gear 36 engaging the shutter shaft gear 33 and also engages third idler gear 37 in meshing engagement with sprocket shaft gear 34 mounted on the sprocket shaft 31 for the first sprocket roller 17 described in FIGS. 4 and 2.

Also illustrated in FIG. 5 is a motor M which directly drives the take-up reel 16 depicted in phantom lines in FIG. 5.

Since the various sprocket roller shafts, prism shaft and shutter shaft are all positively interconnected by the various gears, it is important to provide some means for adjusting the phase relationship between these components when initially threading the movie film in the camera. For example, it might be desirable to rotate the first sprocket roller 17 relative to the second sprocket roller 18 (with reference to FIG. 2) in order to provide a desired tension in the film 20 passing through the film gate 19.

In order that the foregoing adjustment can be carried out, the sprocket shaft gear 34 for the first sprocket roller and the prism shaft gear 32 mounted on the prism shaft 26 which also supports the second sprocket roller are capable of being rotationably adjusted relative to their shafts and without interference with the idler gears. This adjustment is accomplished by mounting these gears on their respective shafts in a removable manner so that they can be removed and rotated slightly and then remounted.

FIG. 6 shows one such arrangement permitting such rotational adjustment independent of the other gears for the sprocket shaft gear 34. Thus, the outer end of the sprocket shaft 31 itself is provided with a tapped opening 38 arranged to register with an opening 39 in the central portion of the gear 34. The tapped opening 38 threadedly receives a threaded bolt 40 terminating at its upper end in an enlarged head 41 which will engage the outer surface of the gear 34. The bolt head 41 in turn may include a small Allen wrench receiving socket 42 so that an Allen wrench shaft 43 can be inserted therein to rotate the same.

OPERATION

In operation, film will be threaded from the pay-out reel 15 as shown in FIG. 2 over the various guide rollers and sprocket rollers as indicated by the path of the film 20, the end of the film being secured to the take-up reel 16. Appropriate tension between the first and second sprocket rollers 17 and 18 can be adjusted if required by adjusting the phase relationship of these sprocket rollers. This phase relationship is in turn controlled by the relative positions of the gears on the shafts for these 5 sprocket rollers and these gears are removable for adjustment, all as described in FIG. 6.

After appropriate adjustments have been made to make sure that proper tension is provided on the film in the film gate 19, the gears for the sprocket shafts are tightly locked in place by threading of the bolt threads 41 in the tapped openings 38 all as described in FIG. 6. It will also be appreciated that by appropriate phase adjustment of the prism shaft gear 32 relative to the position of the shutter shaft gear 33 controlling phasing of the shutter, eclipsing of light can be properly adjusted to occur relative to the time interval between a downward sweep of the image in the film gate by the rotating prism and the start of the next downward sweep by the next prism surface.

Once all the proper adjustments have been effected and the gears locked as described, the camera may be operated at various desired speeds by the motor M rotating the take-up reel 16 which will pull the film in a continuous motion over the various guide rollers and sprocket rollers. The film passing through the film gate 19 will thus be successively exposed to a series of images to provide the desired motion picture film negative. Because of the positive interlocking of the first and second sprocket rollers, multi-surfaced prism and shutter, proper synchronism is at all times maintained and any vertical frame line movement is substantially eliminated. This latter feature is a consequence of the use of two sprocket rollers passing film into the film gate and receiving film from the film gate respectively which sprocket rollers are positively coupled together for simultaneous rotation.

It will also be appreciated from the foregoing design that a long back focus lens can be accommodated within a relatively compact camera casing as a consequence of the optical path folding by the right angle prisms 27 and 28 described in FIG. 3. Moreover, it will be noted that essentially only two right angle prisms or equivalent light directing means are required as opposed to many mirrors or prisms characterizing prior art arrangements.

From all of the foregoing, it will thus be evident that the present invention has provided a greatly improved high speed movie camera essentially eliminating certain problems associated with such prior art cameras.

I claim:

1. A high speed movie camera including, in combination:
   (a) first and second sprocket rollers for passing film into and receiving said film from a film gate respectively;
   (b) an optical means for imaging a scene to be photographed on said film gate including a multi-surfaced prism connected to said second sprocket roller for rotation therewith to cause an imaged scene to move along said film gate with movement of said film through the film gate and first and second light directing means for folding the optical path between said multi-surfaced prism and said film gate to accommodate a longer back focus objective lens within a given sized casing than would otherwise be accommodated;
   (c) shutter means passing in between said first and second light directing means intercepting light passed to said film gate after each rotation of said multi-surfaced prism through a given circumferential distance to enable a series of separate images to be successively recorded on the film while the film continuously moves; and
   (d) positive interconnecting means between said multi-surfaced prism, said shutter means and said first sprocket roller for providing simultaneous rotation thereof in a predetermined synchronous relationship.

2. A camera according to claim 1 in which said intercoupling means comprises an intermeshing gear train.

3. A high speed movie camera including, in combination:
   (a) a casing for mounting pay-out and take-up film reels on one side of a medial plane passing vertically through the interior of the casing and for mounting a front objective lens whose optical axis passes on the other side of said medial plane;
   (b) a multi-surfaced prism on said other side of said medial plane mounted on a prism shaft for rotation about an axis normal to said medial plane in a position intercepting said optical axis, said prism shaft passing through said medial plane to said one side;
   (c) a first right angle prism on said other side of said medial plane in a position behind said multi-surfaced prism to optically direct light passing rearwardly through said multi-surfaced prism in a lateral direction to pass normally through said medial plane;
   (d) a second right angle prism on said one side of said medial plane in a position to optically direct light received from said first right angle prism in a forward direction to a film imaging gate positioned ahead of said second right angle prism on said one side of said medial plane, the folding of the optical path from the mounting position of the objective lens to said film gate by said first and second right angle prisms enabling accommodation of a longer back focus objective lens length within a given length measured between the front and rear ends of said casing as could otherwise be accommodated;
   (e) a rotatable shutter lying substantially in said medial plane to pass between said first and second right angle prisms and mounted on a shutter shaft extending normally from said medial plane into said other side of said medial plane;
   (f) a first film sprocket roller on said one side of said medial plane mounted on a sprocket shaft for rotation about an axis normal to said medial plane for passing film from said pay-out reel into the entrance of said film gate, said sprocket shaft passing normally through said medial plane to said other side of said medial plane;
   (g) a second film sprocket roller on said one side of said medial plane mounted on said multi-surfaced prism for passing said film from the exit of said film gate to said take-up reel; and
   (h) intermeshing gear means on said other side of said medial plane interconnecting said prism shaft, shutter shaft and sprocket shaft for said first sprocket roller for simultaneous rotation whereby proper synchronism of rotation of said prism with rotation of said shutter and with rotation of said first and second sprocket rollers is assured.

4. A camera according to claim 3, in which said intermeshing gear means includes a prism shaft gear, a shutter shaft gear and a sprocket shaft gear on the ends of said prism shaft, shutter shaft and sprocket shaft respectively; and first, second and third idler gears respectively engaging said prism shaft gear, shutter shaft gear and sprocket shaft gear, said first gear further engaging said second and third gears.

5. A camera according to claim 4, including means for adjusting the rotational position of said prism shaft gear relative to said prism shaft and said sprocket shaft gear relative to said sprocket shaft so that phasing adjustments between said first and second sprocket rollers can be effected to assure that film passing through said film gate is properly tensioned.

* * * * *